Patented Jan. 19, 1937

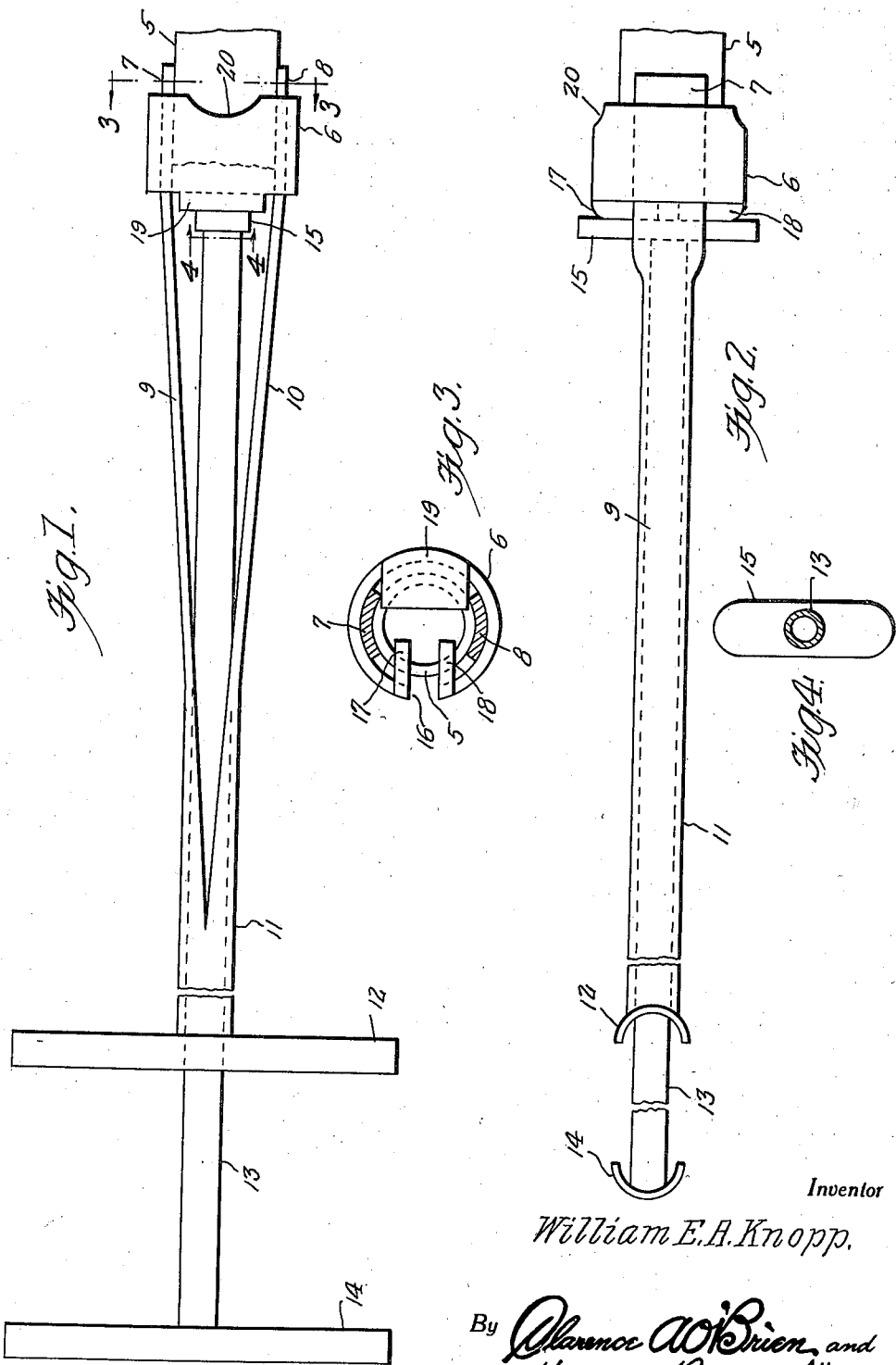

2,068,184

UNITED STATES PATENT OFFICE 2,068,184

PULLER FOR AXLE SHAFTS AND THE LIKE

William E. A. Knopp, Milwaukee, Wis.

Application February 28, 1936, Serial No. 66,301

3 Claims. (Cl. 294—100)

My invention relates generally to means for gripping and pulling upon the ends of rods, and particularly to a device for pulling the broken axle shafts, such as the axle shafts of an automobile rear axle, and an important object of my invention is to provide a puller of this character which enables the mechanic to easily and expeditiously remove a broken axle shaft from a rear end assembly.

Another important object of my invention is to provide a device of the character indicated above which is simple and rugged and can be provided at relatively low cost.

Other important objects of my invention will be apparent from a reading of the following description in connection with the drawing, wherein for purposes of illustration I have shown a preferred embodiment of my invention.

In the drawing:—

Figure 1 is a general top plan view showing the device applied to the end of a broken axle shaft.

Figure 2 is a view taken at right angles to Figure 1.

Figure 3 is a transverse vertical sectional view taken through Figure 1 to the rear of or below the clamp sleeve.

Figure 4 is a transverse vertical sectional view taken through the plunger tube behind the T-head.

Referring in detail to the drawing, the numeral 5 generally designates the end of the broken axle shaft on which is circumposed the clamping sleeve 6 which holds between itself and the diametrically opposite sides of the axle shaft 5 the clamping end portions 7 and 8 of the clamp arms 9 and 10 of the outer tube 11 which has welded to its axially outward end the semi-circular cross section handle 12. Slidable within the outer tube 11 is the inner tube 13 which has on its axially outward end the semi-circular cross section handle 14 which is reversed in position with respect to the handle 12, as indicated in Figure 2, and is welded to the end of the tube 13. The opposite end of the inner tube 13 has welded thereto the T-head 15 which bears against the axially inward side of the clamping sleeve 6 to force the clamping sleeve into clamping relation with the arm ends 7 and 8 and the axle shaft 5.

The clamping sleeve 6 is tubular cylindrical in form and has a longitudinal opening 16 in one side from the edges of which at the axially inward end of the sleeve project the chordally arranged arms 17 and 18 against which the T-head 15 bears. Diametrically opposite the opening 16 is the radially inwardly turned flange 19 which is aligned with the arms 17 and 18 and is arranged also to receive the pressure of the T-head 15 when the latter is pushed by manipulation of the inner tube 13 to press the sleeve 6 into clamping relation to the axle shaft to be removed or pulled, the split 16 enabling the sleeve to expand to ride over the end of the axle during the clamping action.

As shown in the drawing, the handle 12 on the outer tube lies in a plane at ninety degrees to the bifurcation resulting in the legs 9 and 10. It is also to be observed that the handle 14 on the inner tube 13 lies at right angles to the T-head 15. Cut outs 20 in the axially inward edges of the sleeve 6 facilitate handling of the axle shaft.

With the sleeve 6 comparatively loose on the clamp arms 7 and 8 of the legs 9 and 10, the arms 7 and 8 are placed on opposite sides of the axle shaft 5, with the sleeve 6 following onto the axle shaft, and with the T-head 15 in a withdrawn position with respect to the sleeve 6. Then the handle 14 is pushed inwardly or the handles 12 and 14 brought together, so that the T-head 15 is forced against the axially outward end of the sleeve 6, so as to force the sleeve 6 in an axially inward direction to move over the axle shaft end and clamp the arms 7 and 8 firmly to opposite sides of the axle shaft end. The arms 7 and 8 may be tapered so as to have their greatest widths or depths at their radially inward ends, so that the movement of the sleeve 6 in an upward direction in Figure 1 as the result of manipulation of the inner tube 13, will wedge the arms 7 and 8 between the clamping sleeve 6 and the axle shaft.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims

What is claimed is:—

1. A device of the character described for gripping an end of a substantially cylindrical rod or the like, said device comprising a clamping sleeve adapted to assume a position circumposed on the end of the rod or the like, spring arms lying within said clamping sleeve and interposed between opposite sides of the clamping sleeve and corresponding opposite sides of the end of the rod, tubular means on which said arms are mounted, and a plunger working in said tubular means and having a head engageable with the clamping sleeve for forcing the clamping sleeve along the rod end in a direction to compress the said arms in engagement with the said opposite sides of the rod end.

2. A device of the character described for gripping an end of a substantially cylindrical rod or the like, said device comprising a clamping sleeve adapted to assume a position circumposed on the end of the rod or the like, spring arms lying within said clamping sleeve and interposed between opposite sides of the clamping sleeve and corresponding opposite sides of the end of the rod, tubular means on which said arms are mounted, and a plunger working in said tubular means and having a head engageable with the clamping sleeve for forcing the clamping sleeve along the rod end in a direction to compress the said arms in engagement with the said opposite sides of the rod end, said arms being tapered so as to act as wedges.

3. A device of the character described for gripping an end of a substantially cylindrical rod or the like, said device comprising a clamping sleeve adapted to assume a position circumposed on the end of the rod or the like, spring arms lying within said clamping sleeve and interposed between opposite sides of the clamping sleeve and corresponding opposite sides of the end of the rod, tubular means on which said arms are mounted, and a plunger working in said tubular means and having a head engageable with the clamping sleeve for forcing the clamping sleeve along the rod end in a direction to compress the said arms in engagement with the said opposite sides of the rod end, said clamping sleeve being slit longitudinally to permit expansion thereof when forced over the end of the rod to cause the clamping of said arm about the rod.

WILLIAM E. A. KNOPP.